No. 628,169.
J. K. STARLEY.
DRIVING GEAR.
(Application filed Feb. 27, 1899.)
(No Model.)
Patented July 4, 1899.
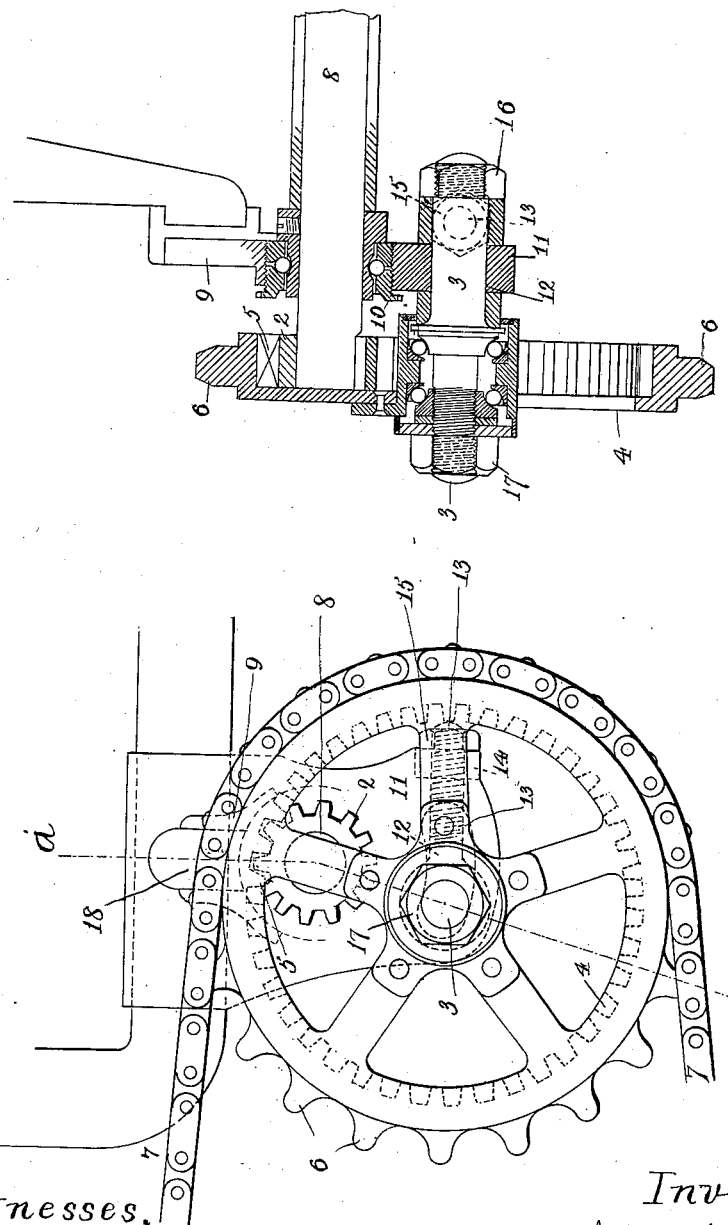
Witnesses,
John R. Anderson.
J. J. Fazakarley.
Inventor,
John Kemp Starley.
per G. Douglas Leechman,
Attorney.
THE NORRIS PETERS CO., PHOTO-LITHO., WASHINGTON, D. C.

UNITED STATES PATENT OFFICE.

JOHN K. STARLEY, OF COVENTRY, ENGLAND.

DRIVING-GEAR.

SPECIFICATION forming part of Letters Patent No. 628,169, dated July 4, 1899.

Application filed February 27, 1899. Serial No. 707,072. (No model.)

*To all whom it may concern:*

Be it known that I, JOHN KEMP STARLEY, a subject of the Queen of Great Britain, residing at Coventry, in the county of Warwick, England, have invented certain new and useful Improvements in Driving-Gear for Motor-Cars, of which the following is a specification.

This invention relates to the driving-gear of motor-cars, which commonly comprises two chains running over two small sprocket-pinions mounted on an intermediate shaft and two large sprocket-wheels mounted on the driving road-wheels. The intermediate shaft is also provided with one or more belt-pulleys and is mounted in bearings, usually three in number, one near each end and one near the center thereof. In order to tension the chains, these bearings are moved on the brackets by which they are connected to the frame of the vehicle, and it will be readily understood that moving the bearings to adjust the chains necessitates the adjustment of the belts also. The sprocket-pinions are generally made of very short radius in order to obtain the necessary reduction of speed between the motor and the driving road-wheels; but this smallness of the sprocket-pinions necessitates very sharp bending of the joints of the chains, and this takes place at a high speed as the chains pass around the said sprocket-pinions. These conditions are very unfavorable to the satisfactory working of the chains and give rise to an unpleasant noise when the gear is in action.

The present invention consists, essentially, in a device which allows the chains to be adjusted in an easy manner and without interfering with the tension of the belts and which also avoids the excessive bending of the chain and reduces the noise above referred to.

The device is illustrated in the accompanying drawings, wherein—

Figure I is a side elevation, and Fig. II is a transverse section on the line *a a* in Fig. I.

Like numerals indicate like parts in both figures.

I replace each of the usual sprocket-pinions by a spur-toothed pinion 2, and on a suitable stud-axle 3 I mount an internally and externally toothed wheel 4 of, say, three times the diameter of the spur-pinion. The internal teeth 5 of the wheel 4 are adapted to mesh with the teeth of the spur-pinion 2, and the external teeth 6 of the wheel 4 are adapted to mesh with the links of the chain 7, the said chain passing around the said internally and externally toothed wheel 4. The links of the chain necessarily bend to much less sharp angles in passing around this wheel 4 than in passing around the usual small sprocket-pinion.

The stud-axle 3, on which the internally and externally toothed wheel 4 is mounted, is adapted to be moved in a curve struck from the axis of the intermediate shaft 8 as a center. This may be carried out in various ways. In the arrangement shown in the drawings the case 9 of the bearing 10, carrying the end of the intermediate shaft 8, may be extended downward as a plate or bracket 11. In this plate is formed the transverse curved slot 12, through which passes the stud 3, carrying the wheel 4 on ball-bearings. The stud is bolted in place and is adjusted by a draw-screw 13 passing through a right-angle projection 14 on the plate, and is provided with a nut 15 beyond the projection. To tighten the chain, the nut 16 on the stud 3 is released and the nut 15 on the draw-screw 13 is rotated until the distance between the sprocket-wheels around which the chain 7 runs is increased as much as required, when the stud-nut 16 is retightened and the adjustment locked. The nut 17 is used to lock the adjustment of the ball-bearings of the wheel 4. Whether the wheel 4 be moved by these particular means or by any other arrangement comprising the curved movement of the stud-axle 3 it will be observed that the adjustment of the chain does not involve any change in the position of the intermediate shaft 8, and hence does not interfere with the tension of the belt or belts running over the pulleys mounted thereon. The necessity of moving the bearings 10, carrying the intermediate shaft, is avoided, and the two chains may be adjusted independently.

In order to reduce the strain on the wheel 4 and pinion 2 and their bearings, I arrange the axes of the said wheel and pinion in or approximately in a line drawn at right angles to the driving-run of the chain from the end 18 of such run and place the axis of the spur-pinion 2 between the axis of the wheel 4 and the said end 18 of the driving-run of the chain, so that the power and resistance are applied to the internally and externally toothed wheel 4 at points thereon as near together as possible. As the positions of the parts are subject to alteration in adjusting the chain, I prefer to so arrange the parts that the mean position allowed by the chain-adjusting device is that above described.

It will be obvious that my invention may be applied to chain-gearing for motor-cars arranged in other positions than that above described and to gearing in which belts and pulleys are substituted for the above-mentioned chains and sprocket-wheels, or vice versa.

What I claim, and desire to secure by Letters Patent of the United States, is—

1. In driving-gear for motor-cars, the combination of a rotatable shaft, a spur-pinion fixed to such shaft, a stud adapted to be moved about such shaft as center, an internally-toothed wheel mounted on the said stud and always gearing with the said spur-pinion, means for transmitting motion from the periphery of the said internally-toothed wheel and means for moving and fixing the said stud, for the purposes set forth.

2. In driving-gear for motor-cars, the combination of a rotatable shaft, a spur-pinion fixed to such shaft, an internally-toothed wheel gearing with the said spur-pinion, a flexible transmitting member engaging with the periphery of the said internally-toothed wheel, a stud adapted to carry the said internally-toothed wheel situated in a line passing through the axis of the spur-pinion and standing at right angles to the end of the driving-run of the flexible transmitting member, for the purpose set forth.

3. In driving-gear for motor-cars, the combination of a rotatable shaft, a spur-pinion fixed to such shaft, a stud adapted to be moved about such shaft as center, an internally-toothed wheel mounted on the said stud and gearing with the said spur-pinion, a fixed plate, there being a transverse slot in the said plate, curved with the axis of the shaft as center and adapted to carry the said stud, an apertured right-angle projection on the said plate a draw-screw engaging the said stud and passing through the said projection, an adjusting-nut on the said draw-screw and a lock-nut on the said stud, substantially as and for the purpose set forth.

4. In driving-gear for motor-cars, the combination of a rotatable shaft, a spur-pinion fixed to such shaft, a stud adapted to be moved about such shaft as center, an internally-toothed wheel mounted on the said stud and gearing with the said spur-pinion and a flexible transmitting member engaging with the periphery of the said internally-toothed wheel, substantially as and for the purpose set forth.

J. K. STARLEY.

Witnesses:
DOUGLAS LEECHMAN,
RICHD. STARLEY.